June 19, 1928.  
G. A. KING  
1,674,598  
HINGED DOUBLE PIN LOCKING FASTENER  
Filed Jan. 3, 1928
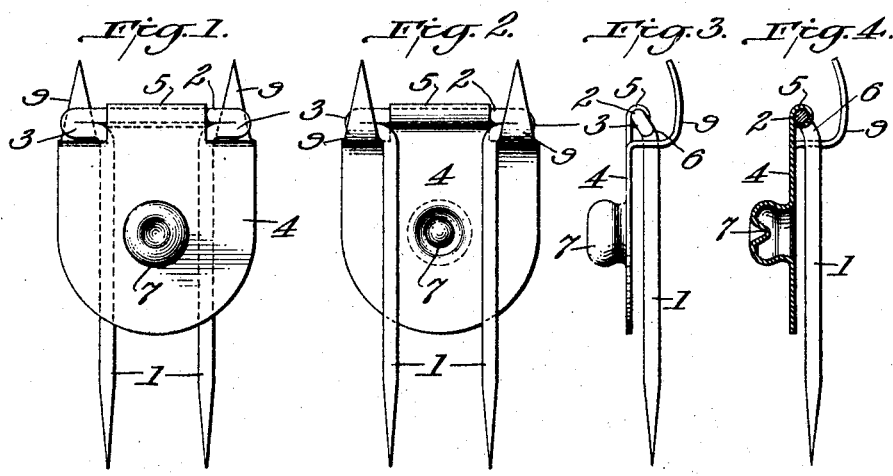
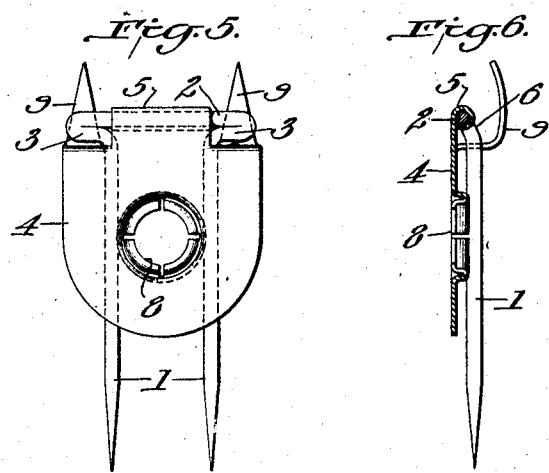
Inventor:  
George A. King  
by  
W. H. Finnerel  
Attorney Patented June 19, 1928.

1,674,598

UNITED STATES PATENT OFFICE.

GEORGE A. KING, OF WATERBURY, CONNECTICUT, ASSIGNOR TO SCOVILL MANUFACTURING COMPANY, OF WATERBURY, CONNECTICUT, A CORPORATION OF CONNECTICUT.

HINGED DOUBLE-PIN LOCKING FASTENER.

Application filed January 3, 1928. Serial No. 244,157.

The object of this invention is to provide a pin-mounted snap fastener which locks itself in position.

The invention consists of a double-pointed pin having a substantially T-shaped head, on which is hinged a snap fastener element having prongs at opposite sides which extend rearwardly and when in position of use project upwardly and engage the material in which the pin is stuck, so as to lock the pin in position, the T-shaped head of the pin projecting laterally on both sides of the hinged element of the fastener part and the prongs extending from the fastener part at its sides beyond the hinge; the laterally extending portions of the head of the pin together with the prongs adjacent thereto affording a broad base for the device to prevent the tipping of the device in use, as I will proceed now to explain more fully and finally claim.

In the accompanying drawings illustrating the invention, in the several figures of which like parts are similarly designated, Figure 1 is a front elevation showing the parts as they will appear in use, the fastener element being a stud; Fig. 2 is a rear elevation; Fig. 3 is a side elevation, and Fig. 4 is a vertical section. Fig. 5 is a front elevation showing the invention as embodying a socket member of a snap fastener, and Fig. 6 is a vertical section of the invention as shown in Fig. 5.

It is to be understood at the outset, that the invention is not limited to any particular form or construction of the stud element or the socket element. As shown in the drawings, the stud element is rigid or non-resilient, while the socket member is resilient, although the invention is equally applicable to a resilient stud member and a rigid or non-resilient socket member.

The pin is of the double-pointed variety, having a pair of pointed limbs 1, and a head comprising the cross bar 2 extended laterally beyond the limbs and with the bends 3 of the limbs closely underlying the cross bar, the construction described being herein referred to as the head of the pin.

The fastener element comprises a plate 4, having a hinge element 5 of less width than the extreme width of the plate and of a width sufficient to project between the limbs of the pin at the head of the pin and engaged with the cross bar so as to turn thereon. In order to throw the fastener element away from the pin, the head of the pin, as shown at 6, is inclined forwardly, thus permitting the fastener element to extend substantially parallel with the limbs of the pin. The fastener element may be provided with a rigid or non-resilient stud 7, made integral therewith as indicated in Figs. 1 to 4, or applied thereto; and instead of a rigid or non-resilient stud, there may be employed a resilient stud; or instead of a resilient stud there may be used a resilient socket member 8, as shown in Figs. 5 and 6, made integral therewith or applied thereto; or instead of a resilient socket there may be used a non-resilient socket. Of course, it will be understood, that it is common in snap fasteners to use rigid or non-resilient studs with resilient sockets, and resilient studs with non-resilient sockets.

In order to provide for locking the pin fastener in place, the fastener plate has at its hinged end the rearwardly and upwardly extending prongs 9, which are arranged adjacent to the lateral extensions of the pin head and thus are spaced widely apart. The lateral extensions of the pin head and the adjacent prongs afford a wide base which serves to prevent the tipping of the pin fastener in use and thus ensures its stability.

It will be understood that the invention is especially applicable to attaching covers to the upholstery of automobiles. The covers will be supplied with the complemental members of the snap fasteners, either socket or stud, and the pins will be stuck in the upholstery, preferably points down. In sticking the pins in the upholstery, the snap fastener element is turned in the direction opposite to that shown in the drawings so that the prongs will extend below the headed pin, and then when the pin is pushed home, the fastener plate is rotated on the cross bar of the pin which will serve to thrust the prongs into the upholstery and thereby anchor or lock the pins in position. It will be noticed that the prongs act on the outside of the pin limbs and at a considerable distance apart, and this feature and the additional feature of the broad spread of the head of the pin afford a broad base which ensures against the tipping of the fastener in use.

By the provision of a hinged snap fastener element, it is possible to stick the pins in place vertically at right-angles to the article upon which the pins are applied, thus insuring facility of application. The snap fastener element will then lie upon the outside of the article in convenient position to be engaged by its complemental part on the element to be secured, such as a seat cover.

An additional advantage of the construction is its simplicity, which makes for economy in the manufacture of the article.

Variations in details of construction are permissible within the principle of the invention and the claims following.

What I claim is:—

1. A fastener, comprising a double-pointed pin having a head extending laterally beyond the limbs of the pin and affording a cross bar, and a plate having a snap fastener element hinged to the cross bar between the lateral extensions of the head, and means on the plate for locking the device in position of use.

2. A fastener, comprising a double-pointed pin having a head extending laterally beyond the limbs of the pin and affording a cross bar, and a plate having a snap fastener element hinged to the cross bar between the lateral extensions of the head, and prongs projecting rearwardly from the plate next to the pin head for locking the fastener in position of use.

3. A fastener, comprising a double pointed pin having a T-shaped head projecting laterally beyond the limbs of the pin and including a cross bar between said lateral projections, a plate having a snap fastener element, and a hinge member applied to the cross bar between the limbs of the pin, and locking elements on the plate next to the lateral projections of the pin head and extending rearwardly.

4. A fastener, comprising a double-pointed pin having a head extending laterally beyond the limbs of the pin and affording a cross bar, the head being inclined forwardly, and a plate hinged to the cross bar between the limbs of the pin and extending laterally beyond the limbs of the pin and beyond the hinged member and provided with pin-locking means.

5. A fastener, comprising a double-pointed pin having a head extending laterally beyond the limbs of the pin and affording a cross bar, the head being inclined forwardly, and a plate hinged to the cross bar between the limbs of the pin and extending laterally beyond the limbs of the pin and beyond the hinged member and provided with rearwardly extending prongs adjacent to the lateral projections of the pin head and extending upwardly when in use.

In testimony whereof I have hereunto set my hand this 31st day of December A. D. 1927.

GEORGE A. KING.